United States Patent
Miyazaki et al.

(10) Patent No.: US 7,500,166 B2
(45) Date of Patent: Mar. 3, 2009

(54) DATA RECEIVING APPARATUS AND HYBRID-ARQ COMMUNICATION SYSTEM

(75) Inventors: Shunji Miyazaki, Kawasaki (JP); Kazuhisa Obuchi, Kawasaki (JP); Tetsuya Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 763 days.

(21) Appl. No.: 11/152,902

(22) Filed: Jun. 15, 2005

(65) Prior Publication Data

US 2005/0235190 A1 Oct. 20, 2005

Related U.S. Application Data

(63) Continuation of application No. PCT/JP03/06604, filed on May 27, 2003.

(51) Int. Cl.
G08C 25/02 (2006.01)
H04L 1/18 (2006.01)
(52) U.S. Cl. .................................................. 714/748
(58) Field of Classification Search ................. 714/748
See application file for complete search history.

(56) References Cited

U.S. PATENT DOCUMENTS

| | | | |
|---|---|---|---|
| 5,828,677 A | 10/1998 | Sayeed et al. | |
| 6,138,260 A | 10/2000 | Ketseoglou | |
| 6,438,723 B1 | 8/2002 | Kalliojarvi | |
| 6,741,581 B1 * | 5/2004 | Sun et al. | 370/338 |
| 7,254,765 B2 * | 8/2007 | Meyer et al. | 714/748 |
| 2002/0046379 A1 | 4/2002 | Miki et al. | |

FOREIGN PATENT DOCUMENTS

| | | |
|---|---|---|
| JP | 6-046037 | 2/1994 |
| JP | 10-22984 | 1/1998 |
| JP | 2000-4196 | 1/2000 |
| JP | 2000-078118 | 3/2000 |
| JP | 2000-244461 | 9/2000 |
| JP | 2001-119426 | 4/2001 |
| JP | 2001-268058 | 9/2001 |
| JP | 2002-009741 | 1/2002 |
| JP | 2002-185439 | 6/2002 |

OTHER PUBLICATIONS

International Search Report dated Jul. 29, 2003.
David Chase. Code Combining—A Maximum-Likelihood Decoding Approach for Combining an Arbitrary Number of Noisy Packets. IEEE Transactions on Communications, vol. 33, No. 5, May 1985, pp. 385-293.
HTTP://WWW.3GPP.ORG.

* cited by examiner

Primary Examiner—Shelly A. Chase
(74) Attorney, Agent, or Firm—Myers Wolin, LLC

(57) ABSTRACT

A receiver receives data transmitted from a transmitter. The data is stored in a buffer, and a reliability value of the data is computed by a computing unit. A determining unit determines reliability of the data by comparing a reliability value of existing data in the buffer and a reliability value of the data. When the reliability value of the data is higher than a predetermined value, the existing data is combined with the data. Then, an error correcting unit performs error correcting on combined data obtained, and outputs decoded bits. If the combined data includes many errors, retransmission of the data is requested to the transmitter. When the reliability value of the data is lower than the predetermined value, retransmission of data is directly requested without combining the data with the existing data.

17 Claims, 15 Drawing Sheets

FIG.10

INFORMATION DATA

| ... | BLOCK #1 | BLOCK #2 | BLOCK #3 | ... |

FEEDBACK INFORMATION

| ... | ACK/NACK | ADDITIONAL INFORMATION | ACK/NACK | ADDITIONAL INFORMATION | ACK/NACK | ADDITIONAL INFORMATION | ... |

DATA RECEIVING APPARATUS AND HYBRID-ARQ COMMUNICATION SYSTEM

CROSS-REFERENCE TO RELATED APPLICATION

This application is a continuation of International Application PCT/JP03/06604, filed on May 27, 2003, pending at the time of filing of this continuation application, the contents of which are herein wholly incorporated by reference.

BACKGROUND OF THE INVENTION

1. Field of the Invention

The present invention relates to a receiving apparatus and a hybrid automatic repeat request (ARQ) communication system in which data is received using automatic retransmission control and an error correction code to improve a quality of data transmission.

2. Description of the Related Art

In a communication system in which information data is communicated between a transmitter and a receiver, technologies, such as automatic repeat request (ARQ) control and an error correction code (forward error correction (FEC)), are applied to improve data quality of the information data. For example, in a communication system in which processes of retransmitting and combining data are performed, a transmitter processes information bits by adding a parity bit for error detection to a block of the information bits and by performing error-correction-coding, and then transmits all or a part of the information bits processed. At a receiver, when a block of the information bits is received for the first time, the receiver performs error-correction-decoding on the block, and then performs error detection. When no error is detected, confirmation information of positive acknowledgement (ACK) is returned to the transmitter, and when an error is detected, confirmation information of negative acknowledgement (NACK) is returned to the transmitter.

When the transmitter receives the notification information and determines that the notification information is ACK, the transmitter proceeds to transmission processes described above on next block of the information bits. On the other hand, when the transmitter determines that the notification information is NACK, the transmitter retransmits all or a part of coded bits of the block currently being processed. The receiver performs a combining process on the data retransmitted for each bit that corresponds to existing data, and performs error correction and error detection processes again using combined data. In this manner, the receiver repeats, within a predetermined maximum number of times, a trial of the decoding process by notification and retransmission to the transmitter described above until no error is detected in a block.

For the combining process described above, there are known technologies as described below. In a technology disclosed in IEEE Trans. on Common, Vol. 33, pp. 385-393, May 1985 titled "Code Combining: A maximum-likelihood decoding approach for combining an arbitrary number of noisy packets" by D. Chase, for an ARQ scheme in which transmission of a single packet is repeated until all data blocks become error-free, reliability is defined for each received packet, and the reliability is taken as a weight by which likelihood data of each received packet is multiplied. A technology disclosed in Japanese Patent Application Laid-Open Publication No. 2000-4196 relates to a retransmission packet capture system under a wireless multi-service communication environment using turbo combining. In the technology, rake combining is performed on delay pulses of different timings in a wideband code division multiple access (W-CDMA) or the like, based on the technology disclosed in IEEE Trans. on Common, Vol. 33, pp. 385-393, May 1985 mentioned above. In addition, in definitions disclosed in third-generation cellular phone standard, release 5, "3GPP Rel.5", the Internet information of a value measure for a signal-to-interference ratio (SIR) that indicates a noise state among reception characteristics for a channel of a channel quality indicator (CQI), is added to feedback information of ACK or NACK, and is then transmitted from a receiving side to a transmitting side.

However, in the conventional technologies described above, a process of combining retransmission data is performed at the receiving side, thereby disadvantageously requiring a superfluous decoding process, causing data deterioration as a result of combining and increased power consumption because the combining process and other processes are performed.

First, in the technology disclosed in IEEE Trans. on Common, Vol. 33, pp. 385-393, May 1985, it is defined that "if packet characteristics are deteriorated, nothing is added at all (the weight is 0) in some cases". In a specific example of such a scheme of determining the weight, when a binary symmetric channel is subjected to maximum likelihood decoding and an error rate $P_i$ of a packet i is known, a weight $W_i$ is defined by $$w_i = \ln\frac{1-p_i}{p_i} \quad (1)$$

and, as for a Gaussian noise propagation path, a dispersion $\sigma_i^2$ is used to define the weight as $$w_i = \frac{1}{\sigma_i^2} \quad (2)$$

If these weights shown above are used as the reliabilities, the combining process is performed every time. Only under an extremely rare condition, the weight accidentally becomes 0 and the combining process is not performed. Therefore, the combining process is performed even when no effect is produced by the combining process. As a result, an unnecessary process is performed by an error rate determining unit, thereby increasing power consumption.

Moreover, in the technology disclosed in IEEE Trans. on Common, Vol. 33, pp. 385-393, May 1985, the combining process is performed every time. Therefore, if data combined includes deteriorated data, this can affect combination result by causing further deterioration to make a state of the data worse than that before combining. Moreover, even when retransmission data is deteriorated and evidently does not provide any improvement, such retransmission data is combined anyway for error correction. Such an unnecessary process increases the power consumption.

Furthermore, in the technology disclosed in third-generation cellular phone standard, release 5, "3GPP Rel.5", the feedback information to be transmitted to the transmitting side only includes the SIR measurement value. Therefore, it is impossible to grasp, at the transmitting side, the combination process performed at the receiver side and a state of data currently stored. As a result, an appropriate retransmission process cannot be performed.

In view of the above problems, it is an object of the present invention to provide a receiving apparatus that can prevent data deterioration and that reduces the number of retransmission by performing an optimum retransmission requesting process depending on a state of data reception and an error-correction-coding process. Another object of the present invention is to provide a hybrid-ARQ communication system in which data deterioration is prevented, the number of retransmission is reduced by performing an optimum retransmission requesting process depending on the state of data reception and an error-correction-coding process, and quality and throughput of data transmission with a transmitter are improved.

SUMMARY OF THE INVENTION

It is an object of the present invention to solve at least the above problems in the conventional technology.

An apparatus for receiving data transmitted using an automatic repeat request and an error correcting code according to one aspect of the present invention includes a reliability calculating unit that calculates a reliability value that indicates reliability of data in a state of being received; an error correcting unit that corrects an error in the data received and that outputs information on a state of an error correction; a combining unit that combines, when the data received is resending data re-transmitted from a transmitter, the resending data with existing data; a determining unit that performs, when the reliability value is higher than a predetermined value, instructing the combining unit to combine the resending data with the existing data and determining whether to make a resending request based on the state of the error correction, and when the reliability value is lower than the predetermined value, performs outputting the resending request to the transmitter without instructing the combining unit to combine the resending data with the existing data; and a responding unit that responses to the transmitter by transmitting information on a result of the determination by the determining unit.

A communication system according to another aspect of the present invention includes a transmitter and a receiver, and in the communication system, data is transmitted and received between the transmitter and the receiver using an automatic repeat request and an error correcting code. The receiver includes a reliability calculating unit that calculates a reliability value that indicates reliability of data in a state of being received; an error correcting unit that corrects an error in the data received and that outputs information on a state of an error correction; a combining unit that combines, when the data received is resending data re-transmitted from a transmitter, the resending data with existing data; a determining unit that performs, when the reliability value is higher than a predetermined value, instructing the combining unit to combine the resending data with the existing data and determining whether to make a resending request based on the state of the error correction, and when the reliability value is lower than the predetermined value, performs outputting the resending request to the transmitter without instructing the combining unit to combine the resending data with the existing data; and a responding unit that responses to the transmitter by transmitting feedback information including information on a result of the determination by the determining unit and additional information on data combining performed by the data combining unit. The transmitter includes an information receiving unit that receives the feedback information; and a transmission-pattern specifying unit that specifies a transmission pattern by reconfiguring contents of the resending data based on the additional information when the feedback information indicates the result to make the resending request.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 10 is a schematic for illustrating contents of information data and feedback information that are transmitted and received in a hybrid-ARQ communication system according to the present invention;

DETAILED DESCRIPTION OF THE PREFERRED EMBODIMENTS

Figure 1:
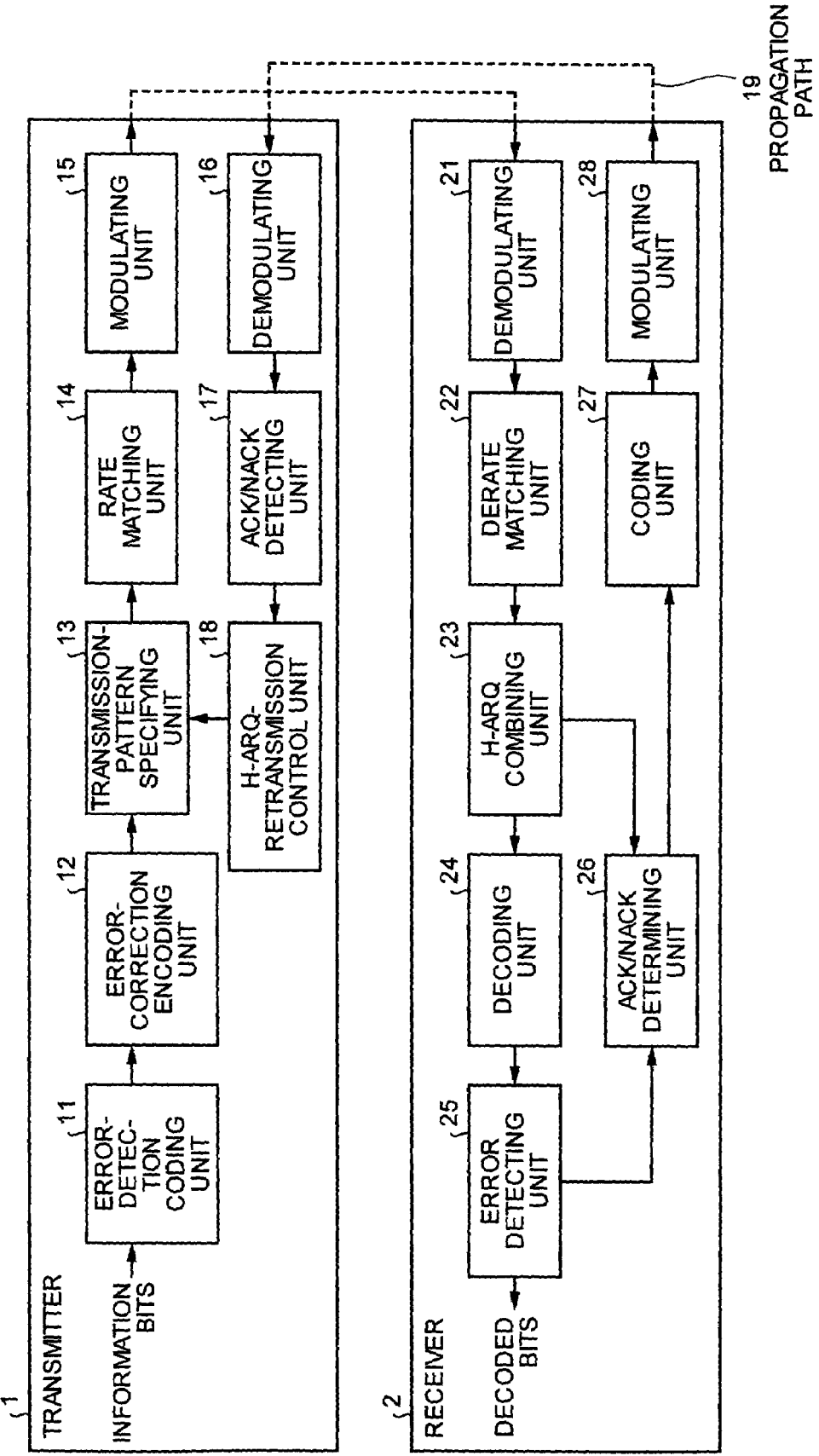
FIG. 1 is a block diagram of a data receiving apparatus according to a first embodiment of the present invention.

Exemplary embodiments of the present invention are described in detail below with reference to the accompanying drawings. In a hybrid-ARQ (H-ARQ) communication system according to the present invention, hybrid-ARQ technology, which is one of high speed downlink packet access (HSDPA) technologies, is used for a high-speed downlink shared channel (HS-DSCH) of the W-CDMA system defined in third-generation cellular phone standard specifications (third generation partnership project (3GPP)), release 5, to perform retransmission control using ARQ and error correction code (FEC) in combination. Specifically, a structure of H-ARQ includes an H-ARQ-retransmission control unit 18 on a side of a transmitter 1 and an H-ARQ combining unit 23 on a side of a receiver 2. First, each of embodiments of the receiving apparatus according to the present invention is described.

FIG. 1 is a block diagram of a structure of a receiving apparatus according to a first embodiment the present invention. As shown in FIG. 1, the transmitter 1 corresponds to a base station and the receiver 2 corresponds to a mobile station in a W-CDMA system. The transmitter 1 includes an error-detection coding unit 11 to which information bits are input, an error-correction coding unit 12, a transmission-pattern specifying unit 13, a rate matching unit 14, a modulating unit 15, a demodulating unit 16, an ACK/NACK detecting unit 17, and the H-ARQ-retransmission control unit 18.

In the transmitter 1 having such a structure described above, the error-detection coding unit 11 adds a cyclic redundancy check (CRC) parity to information bits of an HS-DSCH transport channel, the error-correction coding unit 12 performs turbo coding, the rate matching unit 14 performs rate matching, and then, the modulating unit 15 performs modulation with a quadrature phase shift keying (QPSK) or 16 quadrature amplitude modulation (16QAM) scheme on the information bits. The information bits are transmitted via a propagation path (wireless propagation path) 19 to the receiver 2. A turbo code is a systematic code in which information bits themselves are included as systematic bits. Since the coding rate is 1/3 in the 3GPP specifications, two parity bits are assigned to one systematic bit. After coding, the rate matching unit 14 performs repetition or removal (puncturing) of bits so that the information bits are suited for the size of a physical channel. Particularly, in the puncturing, several bits are removed from the parity bits to compress a data length, thereby increasing the coding rate. For example, if three parity bits are assigned to two information bits, the coding ratio is 2/5. With this, although error correction capability is deteriorated under the same propagation environment and with the same transmission electric power, speed of information transmission can be increased.

The receiver 2 includes a demodulating unit 21, a derate matching unit 22, the H-ARQ combining unit 23, a decoding unit 24, an error detecting unit 25, an NACK/ACK determining unit 26, a coding unit 27, and a modulating unit 28. The demodulating unit 21 demodulates reception data transmitted from the transmitter 1 and then passes the reception data as likelihood (soft decision) data to the decoding unit 24. These components are described in detail below.

Figure 2:
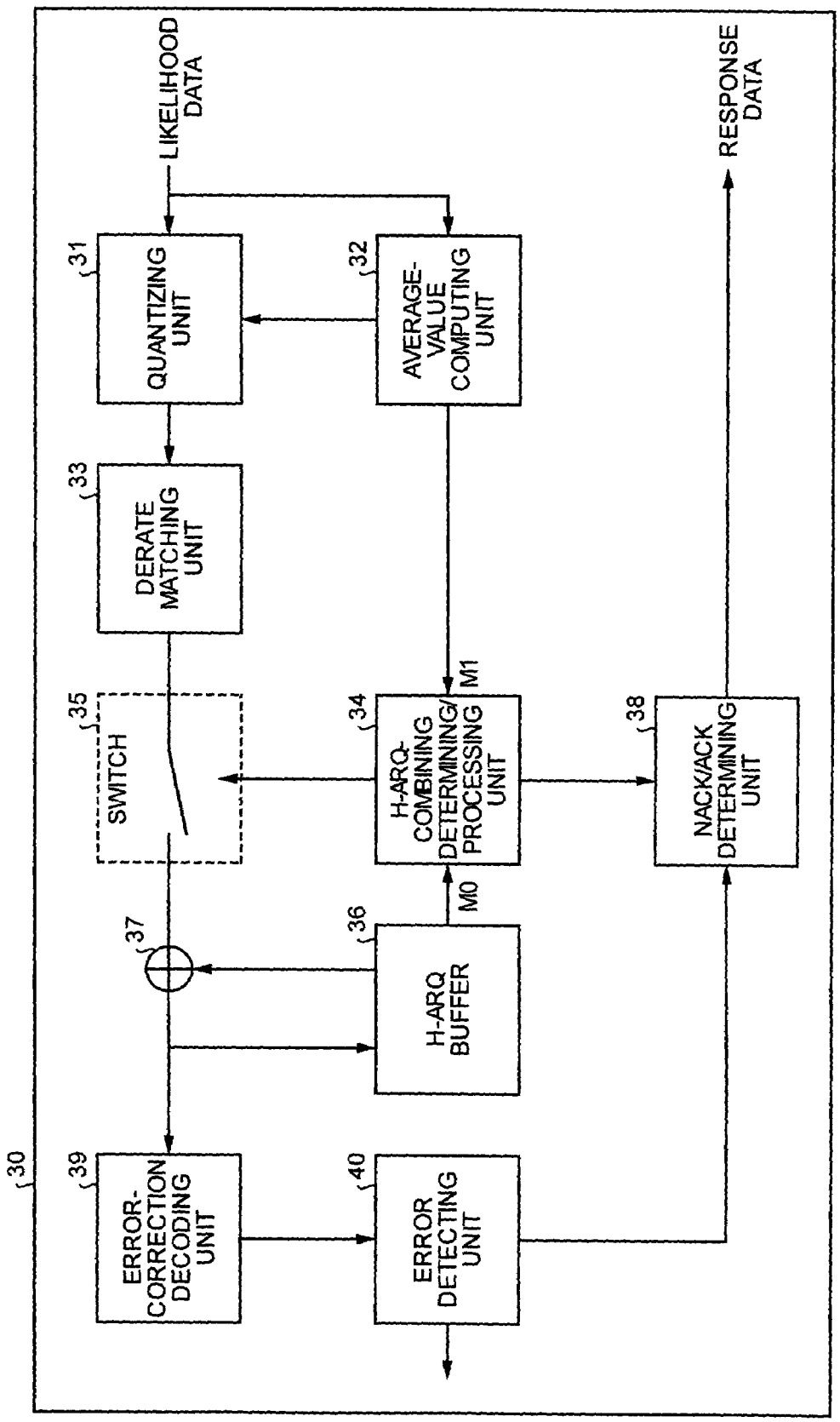
FIG. 2 is a block diagram of a detailed structure of a receiver shown in FIG. 1.

FIG. 2 is a block diagram of a detailed structure of the receiver 2. In FIG. 2, a structure of a codec unit 30, which is a main unit of the receiver 2 shown in FIG. 1, is depicted. The reception data demodulated by the demodulating unit 21 is input as likelihood data to a quantizing unit 31 and an average-value computing unit 32. The average-value computing unit 32 finds an average value (a value obtained by averaging absolute values of the likelihood data) of the likelihood data. The quantizing unit 31 performs a quantizing process by setting a value obtained by doubling the data average value computed by the average-value computing unit 32 as an upper-limit value of the likelihood data, thereby limiting the number of bits per data. Also, as will be described further below, an average value of retransmitted data is taken as M1, and is output to an H-ARQ-combining determining/processing unit 34. At the time of quantizing the likelihood data by the quantizing unit 31, the average-value computing unit 32 decrypts data words before quantization as an index for specifying a quantization range, and retains a bit position of a quantization bit an integer value.

The quantization bit output from the quantizing unit 31 is subjected to a derate matching process by the derate matching unit 33, and is then input via a switch 35 and a combiner 37, which form the H-ARQ combining unit 23 shown in FIG. 1, to an error-correction decoding unit 39. In addition, the H-ARQ combining unit 23 includes the H-ARQ-combining determining/processing unit 34 and an H-ARQ buffer 36. The H-ARQ buffer 36 is provided for storing likelihood data that has failed to be decoded.

As will be described further below, the H-ARQ-combining determining/processing unit 34 determines reliability based on the likelihood data that has failed to be decoded and retransmission data (likelihood data) newly received, and based on the reliability determined, switches between combining and non-combining of the likelihood data that has failed to be decoded and the retransmission data. When the reliability is low, combining is not performed, and when the reliability is high, combining is performed. When the reliability is low and therefore combining is not to be performed, the switch 35 is switched to OFF (open), and feedback information (response signal) of NACK, which is a retransmission request, is sent from an NACK/ACK determining unit 38 to the transmitter 1. At this time, an error correction decoding process by the error-correction decoding unit 39 is not performed, and also decoded bits are not caused to be output.

On the other hand, when the reliability is high and combining is to be performed, the switch 35 is switched to ON (closed), and feedback information (response signal) of ACK is sent from the NACK/ACK determining unit 38 to the transmitter 1. At this time of combining, the likelihood data that failed to be decoded is read from the H-ARQ buffer 36, is combined (added) with retransmission data by the combiner 37, and is then output to the error-correction decoding unit 39. The error-correction decoding unit 39 then performs an error correcting process on the input data. An error detecting unit 40 determines an error using the CRC check, and then outputs decoded bits.

Figure 3:
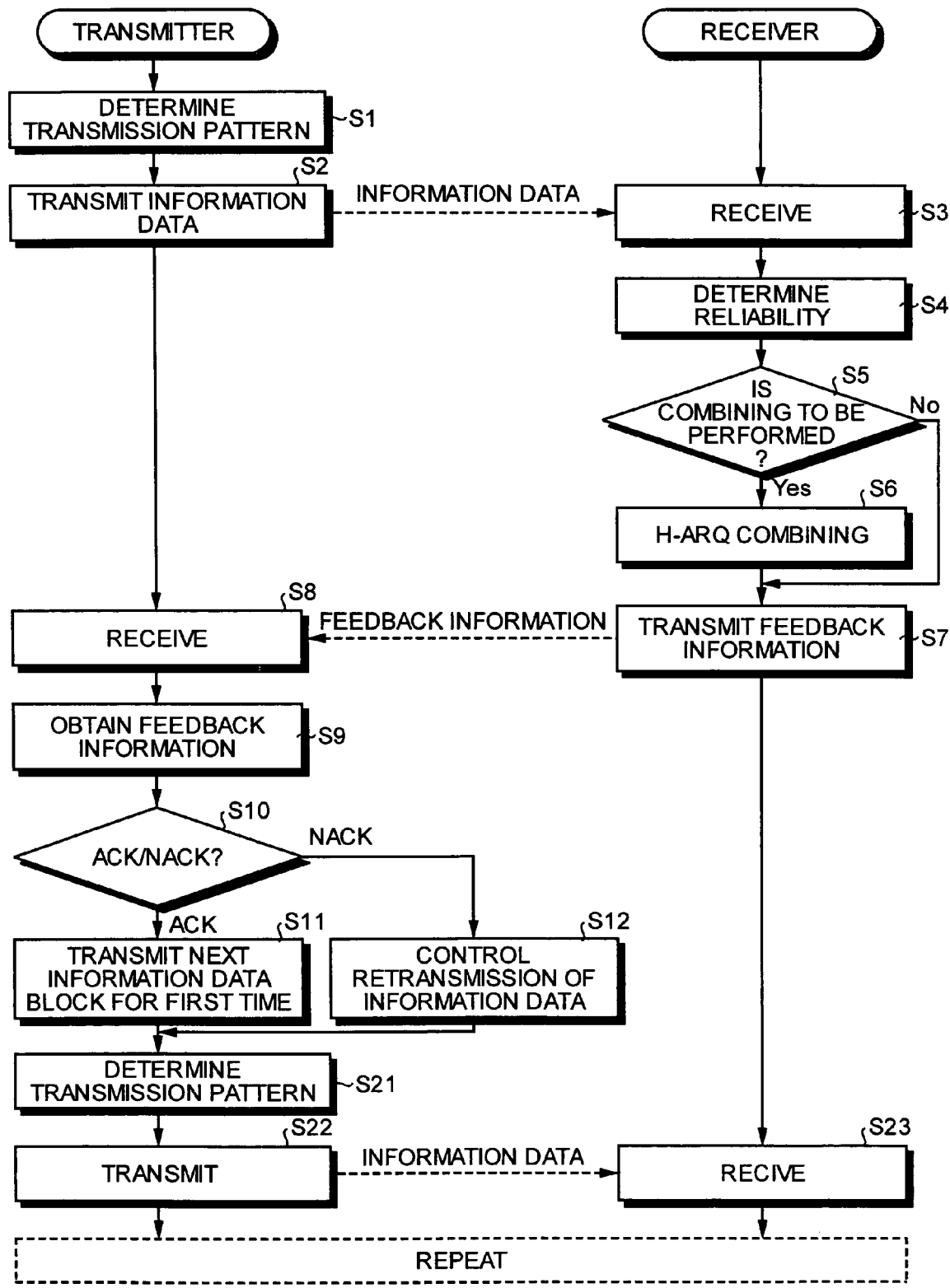
FIG. 3 is a flowchart of a data transmission/reception process according to the first embodiment.

FIG. 3 is a flowchart of a data transmission/reception process according to the first embodiment. In FIG. 3, processes of transmitting and receiving data between the transmitter 1 and the receiver 2 are shown. Since systematic bits are identical to information bits, in extreme cases, demodulation is possible even with 0 parity bit (coding rate 1) when conditions of reception data are satisfactory. Therefore, in a scheme using the H-ARQ scheme according to the present invention, the transmitter 1 determines a transmission pattern (step S1), and then transmits all systematic bits and a part of the parity bits as information data (step S2). The receiver 2 receives such information data (step S3), and the H-ARQ combining unit 23 determines a reliability (step S4).

The reliability is determined based on the following condition (1), using an average value M0 of likelihood data stored in the H-ARQ buffer 36 and the average value M1 of the retransmission data, where a predetermined rate parameter (coefficient) is α, when $M1 \leq M0 \times \alpha$, the reliability is low→combining is not to be performed→determine to transmit NACK (request for retransmission)

when $M1 \geq M0 \times \alpha$ the reliability is high→combining is to be performed→error correcting process→determine to transmit NACK/ACK     (1)

As described above, whether the reliability is high or low can be determined by simply comparing two values, using the rate parameter α.

Next, based on the reliability obtained in the condition (1) above, it is determined whether combining is to be performed (step S5). When the reliability is high and combining is to be performed ("YES" at step S5), the H-ARQ-combining determining/processing unit 34 switches the switch 35 to ON (closed), thereby causing the likelihood data that has failed to be decoded to be read from the H-ARQ buffer 36, to be combined with the retransmission data by the combiner 37, and then to be output to the error-correction decoding unit 39. The error-correction decoding unit 39 performs an error correcting process on the data thus input. The error detecting unit 40 determines an error using CRC check, and then outputs decoded bits. Here, the error-correction decoding unit 39 sets NACK as feedback information to be transmitted to the transmitter 1 if an error is included after the decoding process. On the other hand, if the reliability is low and combining is not to be performed ("NO" at step S5), the switch 35 is switched to OFF (open) not to perform the error-correction decoding process on the likelihood data.

The NACK/ACK determining unit 38 of the receiver 2 transmits feedback information (response signal) to the transmitter (step S7). When data combining is not to be performed, NACK is transmitted. When data combining is to be performed, ACK is transmitted when no error is included after the decoding process by the error-correction decoding unit 39, and NACK is transmitted when an error is included.

The transmitter 1 receives the feedback information transmitted from the receiver 2 (step S8) to obtain the feedback information (step S9). The ACK/NACK detecting unit 17 (refer to FIG. 1) detects either ACK or NACK in the feedback information (step S10). When ACK is included ("ACK" at step S10), initial transmission of next information data block is performed (steps S11, S21, and S22). When NACK is included ("NACK" at step S10), retransmission control of the information data is performed (step S12), and at the time of determining the transmission pattern (step S21), a data pattern of a different coding bit is selected by setting a bit that is not previously sent giving a higher priority. Retransmission is then performed (step S22), and the data is received by the receiver 2 (step S23). At the receiver 2 side, the likelihood data previously failed to be decoded is stored in the H-ARQ buffer 36. Therefore, the retransmission data newly received and the likelihood data stored are combined as a data set for performing a decoding process. The processes described from step S21 to step S23 are similar to those described from step S1 to step S3. After step S23, the transmitter 1 repeats the processes from step S4 and thereafter, in which retransmission regarding the same information bit set is repeated until ACK is received or until the number of retransmission reaches a maximum number thereof. The receiver 2 receives the retransmission data to repeat the combining process described above.

As described above, in the data combining process after it is determined that combining is to be performed, from among the retransmission data, data of the information bit initially transmitted is used as it is as likelihood data. As for redundant data the already sent, a diversity process is performed. For example, in the case of a CDMA communication scheme, data already subjected to maximum-ratio combining by rake combining of a multipath is passed from the modem (the demodulating unit 21) to the codec unit 30. Therefore, inside the codec unit 30, all that is required is to perform merely an addition process at the combiner 37, thereby achieving a simplified process. Also, although the combining process described above changes the average value of the likelihood data, with the average-value computing unit 32 setting a value, for example, by doubling the average value of the absolute value of the reception data as an upper-limit value of the likelihood the quantization bit range at the quantizing unit 31 is appropriately adjusted, thereby allowing stable quantization to be performed.

As such, according to the first embodiment of the present invention, using a hybrid ARQ scheme in which data transmission and reception are performed by combining automatic retransmission control and error correction coding, the reliability of the reception data is determined at the receiver side. Only when the reliability is high, the error correcting process is performed. Thus, since an error correcting process is not performed on reception data having a low reliability, an unnecessary error correcting process on all of the reception data is not performed, thereby reducing processes and power consumption. Moreover, since reception data having a low reliability is not combined, data deterioration due to unnecessary combining can be prevented. Furthermore, since a measurement value that indicates the state of the reception data is used as the likelihood, appropriate retransmission control can be performed corresponding to an actual reception state. Moreover, the number of retransmission via the propagation path can be reduced, thereby improving throughput of the system and enabling effective use of the transmission path by decreasing traffic by an amount equivalent to the reduction of the number of retransmission.

Next, a second embodiment according to the present invention is described. While in the first embodiment described above, the average value is used for determining the reliability, in the second embodiment, a measurement amount of a signal to noise (S/N), which is a signal-to-noise ratio (SNR), is used instead of the average value. In the following description, it is assumed that a signal-to-interference ratio (SIR), which is a measurement amount in the CDMA system, is used.

Figure 4:
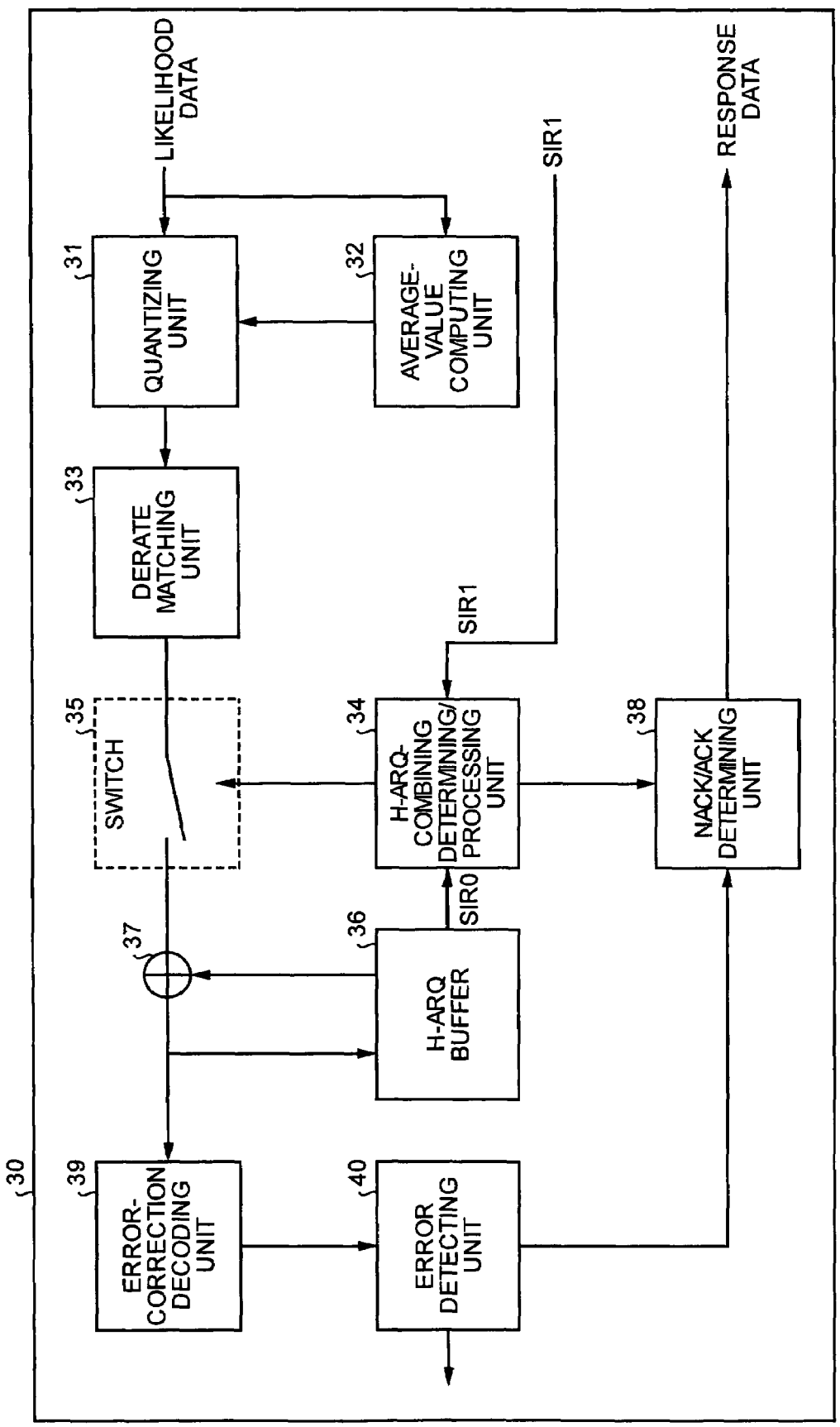
FIG. 4 is a block diagram of a receiving apparatus according to a second embodiment of the present invention.

FIG. 4 is a block diagram of a structure of a receiving apparatus according to the second embodiment. In FIG. 4, components identical in structure to those in the first embodiment described above (refer to FIG. 2) are provided with the same reference numerals. The structure depicted in FIG. 4 is different from the structure depicted in FIG. 2 in that the information used for determination in the H-ARQ-combining determining/processing unit 34 is the SIR. This SIR is measured at the modem (the demodulating unit 21 in FIG. 1), and an average value in units of data intervals for demodulating the reception data bits is used. In the H-ARQ buffer 36, an average value SIR0 of this SIR is stored. The H-ARQ-combining determining/processing unit 34 is supplied with the average value SIR0 of SIR stored in the H-ARQ buffer 36 and an average value SIR1 of SIR at the time of receiving reception data, which is retransmitted. The reliability is determined based on these SIR0 and SIR1. The reliability is determined under the following condition (2), where α is a predetermined ratio parameter.

when $SIR1 < SIR0 \times \alpha$, the reliability is low→data combining is not to be performed→determine to transmit NACK (request retransmission)

when $SIR1 \geq SIR0 \times \alpha$, the reliability is high→combining is to be performed→error correcting process→determine to transmit NACK/ACK (2)

In a determining process described above, the SIR is used instead of the average value of the likelihood data used in the first embodiment. Retransmission control and error correction decoding in H-ARQ control (for example, the process depicted in FIG. 2) can be performed in a manner similar to that in the first embodiment. As such, with the structure using the SIR for a determining process an unnecessary error correcting process on all of the reception data is not performed, thereby reducing processes and power consumption. Also, since reception data having a low reliability is not combined, data deterioration due to unnecessary combining can be prevented. Furthermore, since a measurement value that indicates a state of the reception data is used as the likelihood, appropriate retransmission control can be performed corresponding to an actual reception state. Moreover, the number of retransmission via the propagation path can be reduced, thereby improving throughput of the system and enabling effective use of the transmission path by decreasing traffic by an amount.

Figure 5:
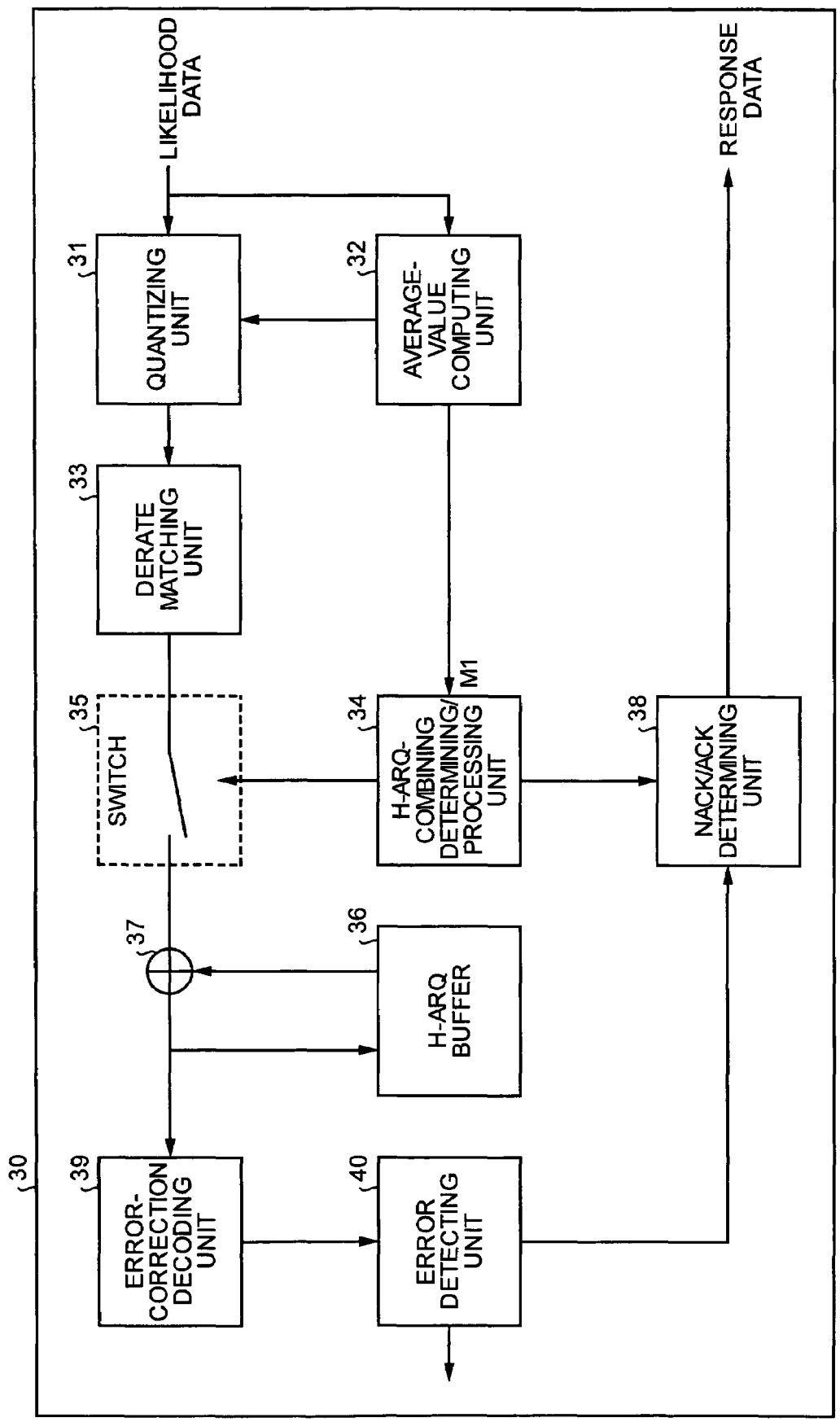
FIG. 5 is a block diagram of a receiving apparatus according to a third embodiment of the present invention.

Next, a third embodiment according to the present invention is described. In the third embodiment, the structure is such that determination is made by the H-ARQ-combining determining/processing unit 34 base on an absolute value of the likelihood data after reception. FIG. 5 is a block diagram of a receiving apparatus according to the third embodiment. As shown in the drawing, in the third embodiment, the average value M1 of the reception data is computed by the average-value computing unit 32. In the H-ARQ-combining determining/processing unit 34, the average value M1 of the reception data is compared with a threshold $\beta$ to determine whether combining is to be performed. The threshold $\beta$ can be set to a predetermined value (level) based on a received data format. Here, in the H-ARQ buffer 36, the likelihood data received at a previous time is stored and is combined (added) with retransmission data at the time of combining. Although the combining process changes the average value of the likelihood data, with the average-value computing unit 32 setting a value, for example, by doubling the average value of the absolute value of the reception data as an upper-limit value of the likelihood, the quantization bit range at the quantizing unit 31 is appropriately adjusted, thereby allowing stable quantization to be performed. The H-ARQ-combining determining/processing unit 34 determines the reliability on the following condition (3).

when M1<$\beta$, the reliability is low→combining is not
   to be performed→determine to transmit NACK
   (request retransmission)

when M1≧$\beta$, the reliability is high→combining is to
   be performed→error correcting
   process→determine to transmit NACK/ACK      (3)

As such, according to the third embodiment, the determination can be made only with the reception data. Therefore, other reception data stored for determining the reliability is not required. Moreover, the determining process can be performed from an initial reception data.

Figure 6:
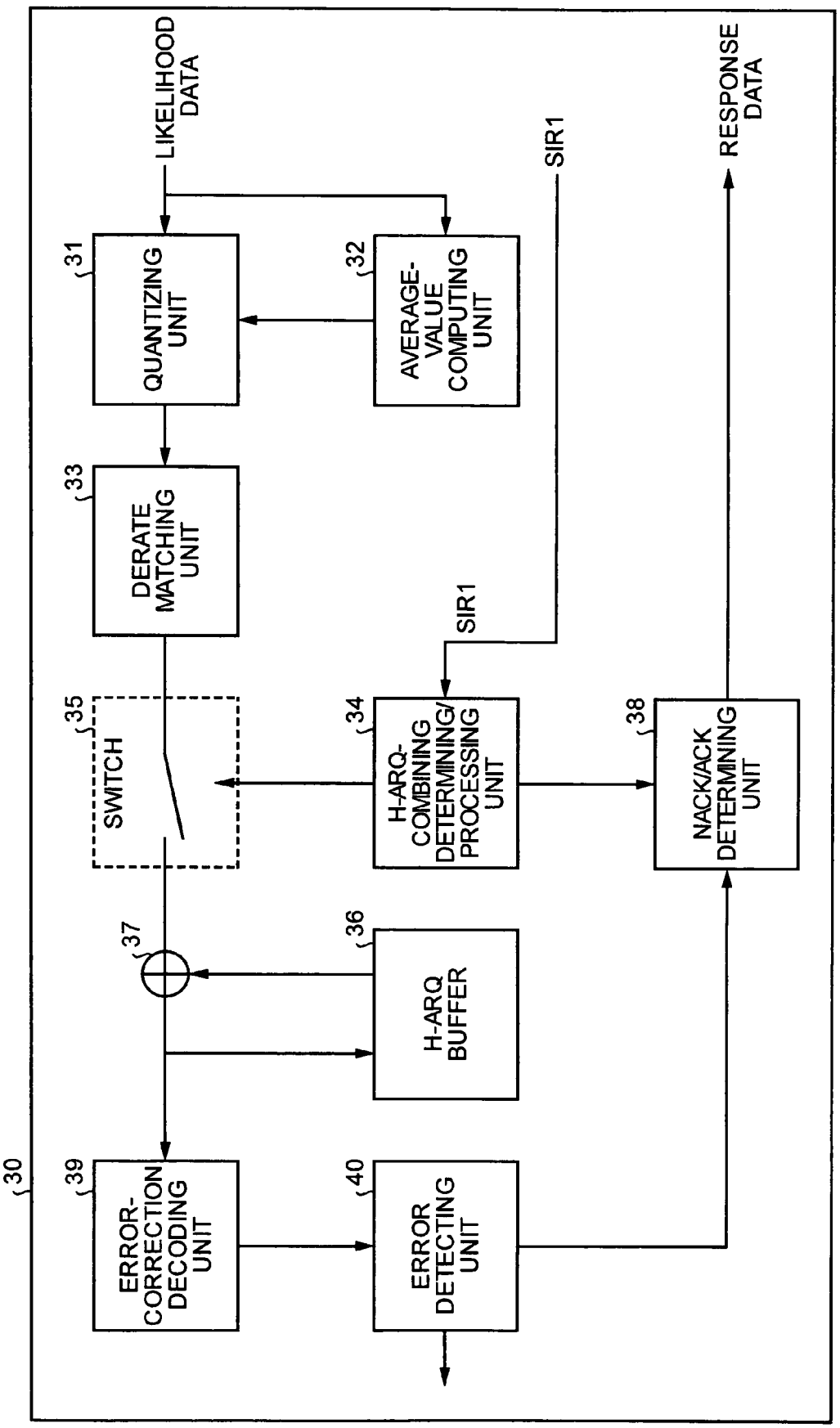
FIG. 6 is a block diagram of a receiving apparatus according to a fourth embodiment of the present invention.

Next, a fourth embodiment according to the present invention is described. The fourth embodiment is different in structure from the third embodiment (FIG. 5) in that the H-ARQ-combining determining/processing unit 34 performs determining process using an absolute value of SIR of the reception data. FIG. 6 is a block diagram of a receiving apparatus according to the fourth embodiment.

The H-ARQ-combining determining/processing unit 34 determines the reliability on the following condition (4), where SIR1 is an SIR of the reception data and $\beta$ is a predetermined threshold for the SIR.

when SIR1≦$\beta$, the reliability is low→combining is
   not to be performed→determine to transmit
   NACK (request retransmission)

when SIR1≧$\beta$, the reliability high→combining is to
   be performed→error correcting
   process→determine to transmit NACK/ACK      (4)

As such, according to the fourth embodiment, the determination can be made using just the SIR of the reception data. Therefore, other SIR stored for determining the reliability is not required. Also, the determining process can be performed from an initial reception data.

Next, a fifth embodiment according to the present invention is described. In the first embodiment described above, at the time of quantizing the likelihood data by the quantizing unit 31, the average-value computing unit 32 decrypts data words, before quantization, as an index for specifying a quantization range, and retains a bit position of the quantization bit as an integer. For example, in data words of 16 bits, a quantization bit position is 6 bits, and this bit position is obtained. In the fifth embodiment, for example, the average values of the data serving as a quantization reference are sequentially scanned from an most significant bit (MSB) side, and a position at which a bit different from the code first appears is taken as a bit position of the quantization bits.

Furthermore, an optimum quantization position after the data combining in data average values obtained as a result of combining of the retransmission data by the H-ARQ scheme is a position different from any of quantization positions of two pieces of data (the reception data stored in the H-ARQ buffer 36 and the retransmission data) before combining. At this time, when the quantization position of the retransmission data is at an extremely lower side compared to the position of the reception data stored, it can be qualitatively expected that the reliability of this retransmission data is low. In such a state, if the stored reception data and the retransmission data are combined together, the quantization position of the data stored is pulled in a lower direction, thereby resulting in possible deterioration in entire data. In such a case, retransmission is rather requested by making determination to transmit NACK without performing the combining process, because reduction in the number of retransmission can be expected.

As such, in the fifth embodiment, the reliability is determined with a bit range of the quantization bits. If the quantization range of the retransmission data is such a quantization range that pulls the quantization range of the reception stored data to a lower level, combining is not performed and determination is made to transmit NACK.

Figure 7:
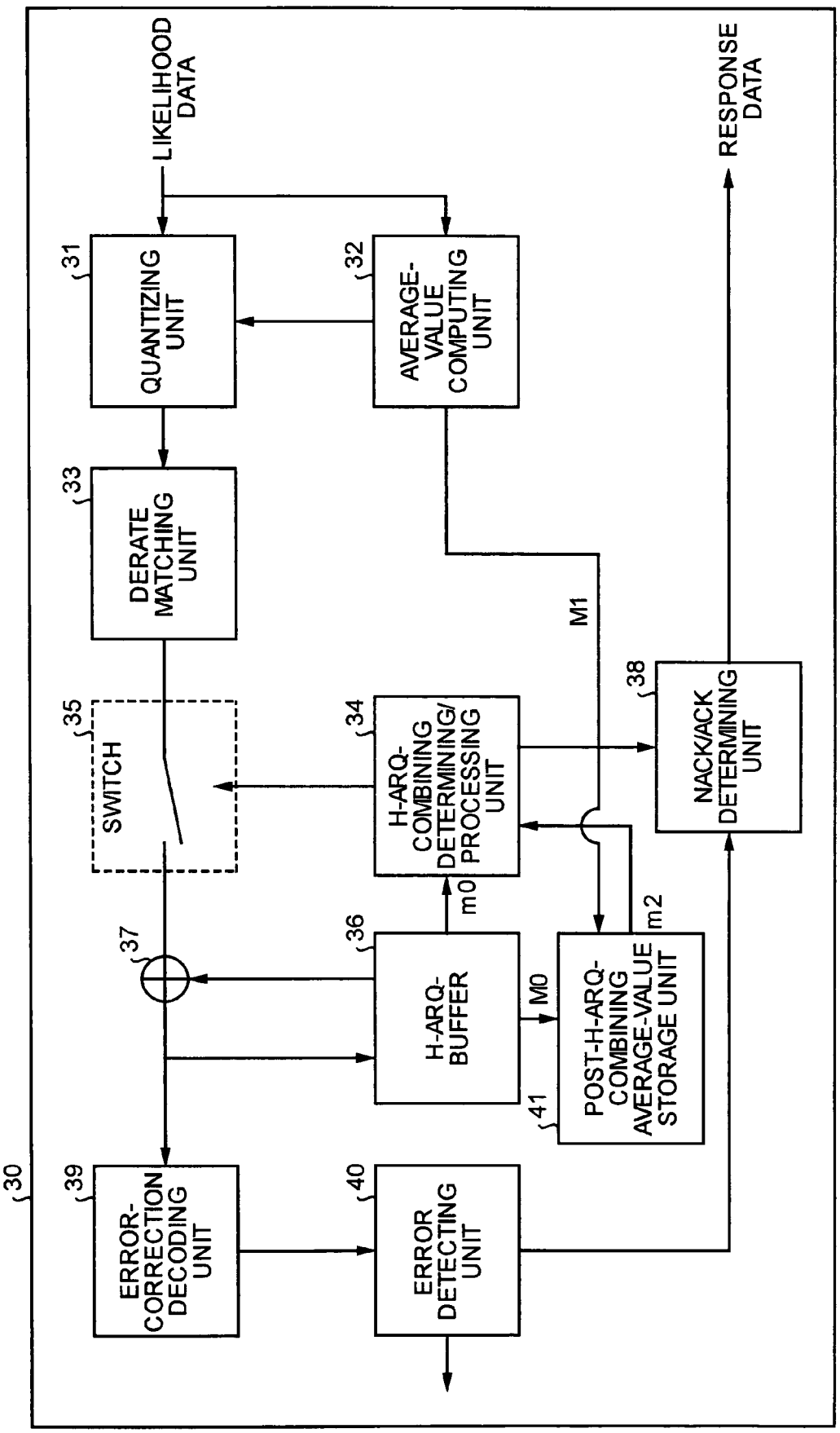
FIG. 7 is a block diagram of a receiving apparatus according to a fifth embodiment of the present invention.

FIG. 7 is a block diagram of a structure of a receiving apparatus according to the fifth embodiment. The H-ARQ buffer 36 stores the reception data (likelihood data) that has failed to be decoded M0, as well as a quantization bit position m0 of this likelihood data M0. Also, a post-H-ARQ-combining average-value storage unit 41 is provided. Based on the average value M0 and the number of data N0 of the existing likelihood data and the average value M1 and the number of data N1 of the retransmission data, the post-H-ARQ-combining average-value storage unit 41 calculates a post-combining average value M2 of data if the likelihood data and retransmission data are combined together, using the following Eq. (3), where N2 is the number of data after combining.

$$M2=(N0\times M0+N1\times M1)/N2 \tag{3}$$

Next, the H-ARQ-combining determining/processing unit 34 compares a quantization bit position m2 of the average value M2 of the data after combining with the quantization bit position m0 of the data stored to determine, under the following condition (5), the reliability of the data after combining.

when m2<m0, the reliability is low→combining is not
   to be performed→determine to transmit NACK
   (request retransmission)

when m2≧m0, the reliability is high→combining is to
   be performed→error correcting
   process→determine to transmit NACK/ACK      (5)

As such, according to the fifth embodiment, the quantization bit position of the data after an assumed combining process is compared with the quantization bit position of the existing data to determine the reliability. if the quantization range of the retransmission data is such a quantization range that pulls the quantization range of the reception data stored to a lower level, combining is not performed and a determination is made to transmit NACK for requesting retransmission. As a result, the number of retransmission can be reduced, and throughput of the system can be improved.

Figure 8:
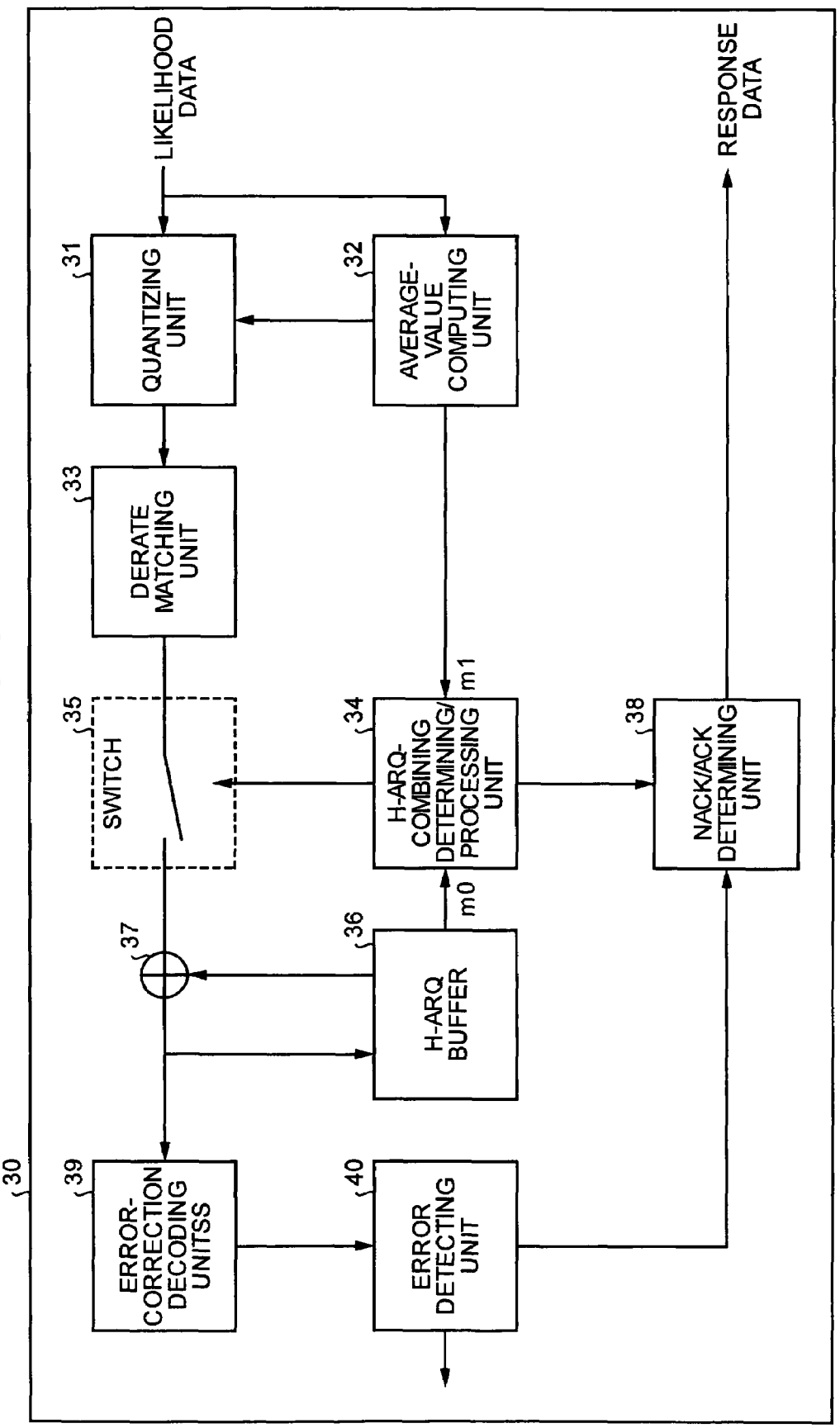
FIG. 8 is a block diagram of a receiving apparatus according to a sixth embodiment of the present invention.

Next, a sixth embodiment according to the present invention is described. The sixth embodiment has a structure such that the determination using the reliability according to the fifth embodiment described above is simplified. FIG. 8 is a block diagram of a structure of a receiving apparatus according to the sixth embodiment. The H-ARQ-combining determining/processing unit 34 is supplied with the quantization bit position m0 of the reception data stored in the H-ARQ buffer 36 and a quantization bit position m1 of the retransmission data. Then, with Nr being taken as a predetermined positive integer (for example, 6 bits, which is the number of quantization bits), a determination is made under the following condition (6).

when $m1<m0-Nr$, the reliability is low→combining is not to be performed→determine to transmit NACK (request retransmission)

when $m1 \geq m0-Nr$, the reliability is high→combining is to be performed→error correcting process→determine to transmit NACK/ACK (6)

As such, in the sixth embodiment, it is determined that data combining is not to be performed when the quantization range of the retransmission data and the quantization range of the data stored do not overlap each other by even a single bit. Thus, by such a simple determination, load on the determining process can be reduced.

Figure 9:
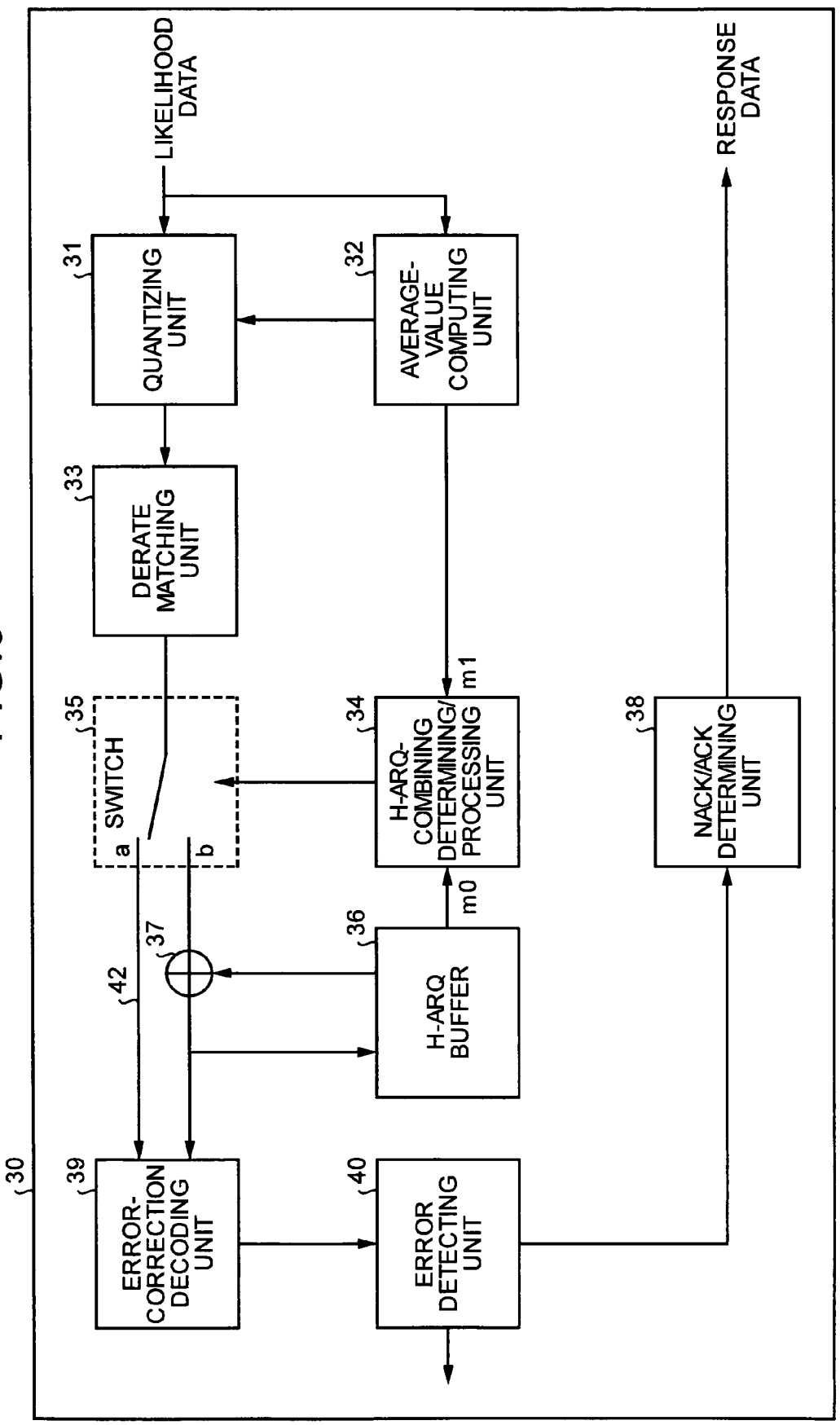
FIG. 9 is a block diagram of a receiving apparatus according to a seventh embodiment of the present invention.

Next, a seventh embodiment according to the present invention is described. The seventh embodiment has a structure such that the determination using the reliability according to the sixth embodiment described above is further simplified. FIG. 9 is a block diagram of a structure of a receiving apparatus according to the seventh embodiment. The H-ARQ-combining determining/processing unit 34 makes a determination under the following condition (7) with Nr of the reception data stored in the H-ARQ buffer 36 being as a predetermined positive integer (for example, 6 bits, which is the number of quantization bits).

when $m1<m0-Nr$, the reliability is low→combining is not to be performed→determine to transmit NACK when $m1 \geq m0-Nr$, the reliability is high→combining is to be performed→error correcting process→determine to transmit NACK/ACK (7)

The reliability determining condition shown above is similar to the condition (6). However, what is different is that, after it is determined that the reliability is low and combining is not to be performed, an error correcting process is performed on the retransmission data by the error correcting decoding unit 39. At this time, the switch 35 is switched to side a, and the retransmission data is output via a route 42 to the error-correction decoding unit 39. Note that, at the time of combining, the switch 35 is switched to side b.

As such, according to the seventh embodiment, even when the reliability is low, the S/N (SIR) may possibly have a satisfactory characteristic. Therefore, even when combining is not to be performed, an error correction process is performed on the retransmission data. After that, depending on a state of the error correcting by the error detecting unit 40, either ACK or NACK is transmitted. With such a structure, the determining process can be simplified.

Next, embodiments of a hybrid-ARQ communication system according to the present invention are described. In the following embodiments, it is assumed that the system has a structure including any one of the receiving apparatuses described in the first to seventh embodiment.

In a featured process in an eighth embodiment, on the side of the receiver 2, the number of times when H-ARQ combining is not performed is counted for each information data block. This number is added to the feedback information together with NACK/ACK, and is then reported to the transmitter 1. FIG. 10 is a schematic for illustrating contents of information data and feedback information that are transmitted and received in the hybrid-ARQ communication system according to the present invention. From the transmitter 1 to the receiver 2, the information data shown in the drawing is transmitted. The information data is transmitted by a plurality of blocks (blocks #1, #2, . . . #n). On the other hand, from the receiver 2 to the transmitter 1, the feedback information shown in the drawing is transmitted. This feedback information is transmitted corresponding to each block of the information data, and includes information that indicates ACK or NACK and additional information.

In the eighth embodiment, in the case in which the feedback information received by the transmitter 1 indicates NACK, the number of times when combining is not performed is obtained, and when the number is equal to a predetermined number, the retransmission process that has been performed so far is reset, and retransmission is performed from the beginning.

Figure 11:
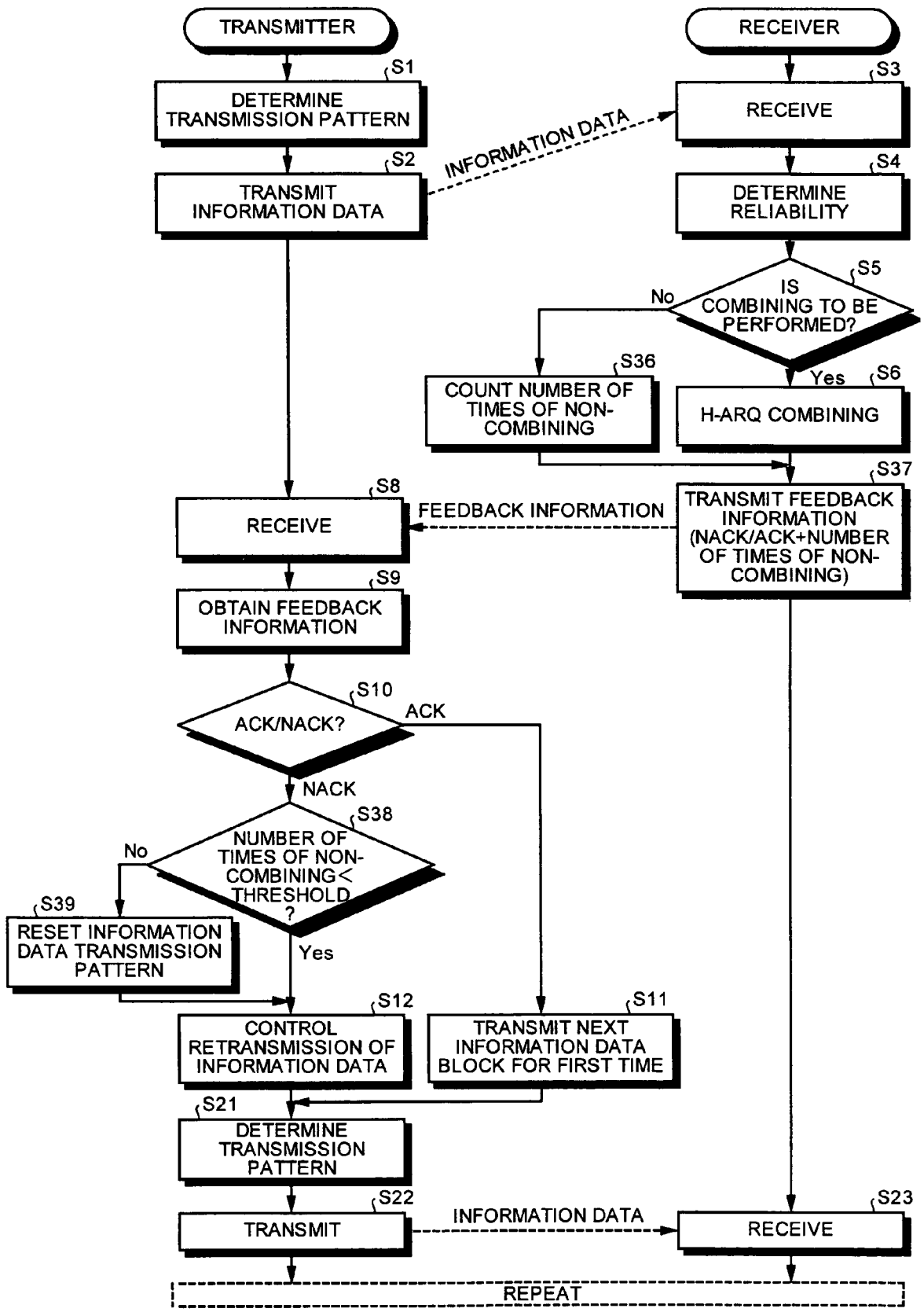
FIG. 11 is a process in a hybrid-ARQ communication system according to an eighth embodiment of the present invention.

FIG. 11 is a flowchart of a process in the hybrid-ARQ communication system according to the eighth embodiment. In FIG. 11, processes identical to those shown in FIG. 3 described above are provided with the same step numbers. First, the transmitter 1 determines a transmission pattern (step S1), and then transmits all systematic bits and a part of parity bits as information data (step S2). The receiver 2 receives such information data (step S3), and the H-ARQ combining unit 23 determines reliability of the information data (step S4). The reliability can be determined by any method described in the first to seventh embodiments.

Next, based on the reliability obtained in the condition (1) above, it is determined whether combining is to be performed (step S5). When the reliability is high and combining is required ("YES" at step S5), the H-ARQ-combining determining/processing unit 34 (refer to FIG. 2) switches the switch 35 to ON (closed), thereby causing the likelihood data that has failed to be decoded to be read from the H-ARQ buffer 36, to be combined with the retransmission data by the combiner 37, and then to be output to the error-correction decoding unit 39. The error-correction decoding unit 39 performs an error correcting process on the data thus input. The error detecting unit 40 determines an error using the CRC check, and then outputs decoded bits. The error-correction decoding unit 39 sets NACK as feedback information to be transmitted to the transmitter 1 if an error is included after the decoding process.

On the other hand, if the reliability is low and combining is not to be performed ("NO" at step S5), the switch 35 is switched to OFF (open), thereby preventing an error-correction decoding process on the likelihood data. Moreover, the number of times when data combining is not performed is counted, and a value obtained by counting is retained (step S36).

The NACK/ACK determining unit 38 of the receiver 2 then transmits feedback information (response signal) to the transmitter (step S37). When data combining is not to be performed, NACK is transmitted. When data combining is to be performed, ACK is transmitted when an error is not included in the data after the data decoding process by the error-correction decoding unit 39, and NACK is transmitted when an error is included. In addition, the value counted at step S36, if any, is added to the feedback information together with ACK or NACK described above to be transmitted as the additional information.

The transmitter 1 receives the feedback information transmitted from the receiver 2 (step S8) to obtain the feedback information (step S9). Then, by the ACK/NACK detecting unit 17 (refer to FIG. 1), ACK or NACK included in the feedback information is detected (step S10). When ACK is included ("ACK" at step S10), initial transmission of a next information data block is performed (steps S1, S21, and S22). When NACK is included ("NACK" at step S10), the number of times when data combining is not performed included in the additional information of the feedback information is detected, and it is determined whether the number of times when data combining is not performed is less than a predetermined threshold (step S38).

When the number of times when data combining is not performed is less than the threshold (number<threshold) ("YES" at step S38), retransmission control of the information data is performed (step S12) and, at the time of determining the transmission pattern (step S21), a data pattern of a different coding bit is selected by setting a bit not previously sent giving a higher priority, and retransmission is then performed (step S22). When the number of times when data combining is not performed is equal to or more than the threshold ("NO" at step S38), the transmission pattern of the information data is reset (step S39), and then steps S12, S21, and S22 are performed.

The receiver 2 receives the data transmitted from the transmitter 1 (step S23). At the receiver 2 side, the likelihood data that previously failed to be decoded is stored in the H-ARQ buffer 36. Therefore, the newly-received retransmission data and the stored likelihood data are combined as a data set for performing a decoding process. The processes described from step S21 to step S23 are similar to those described from step S1 to step S3. After step S23, the transmitter 1 repeats the processes from step S4 and thereafter. Also, the receiver 2 receives the retransmission data to repeat the processes from step S3 to step S37.

According to the eighth embodiment described above, the receiver 2 transmits, as the feedback information, additional information that indicates the process of H-ARQ combining and a current state, together with the information that indicates NACK or ACK. Also, the transmitter 1 receives the feedback information, and then optimizes a scheme of configuring the next retransmission data by using the addition information when a determination is made to transmit NACK. As such, by counting the number of times when data combining is not performed, it is possible to more specifically detect possibility of deterioration of the reception data, and to notify the transmitter 1 the possibility. Moreover, the receiver 2 transmits the number of times when data combining is not performed on the retransmission data as the additional information, and the transmitter 1 reads the number of times from the additional information, and when the number reaches the predetermined number, resets the retransmission pattern to transmit the data again, thereby improving the reception state of the reception data at the side of the receiver 2.

Figure 12:
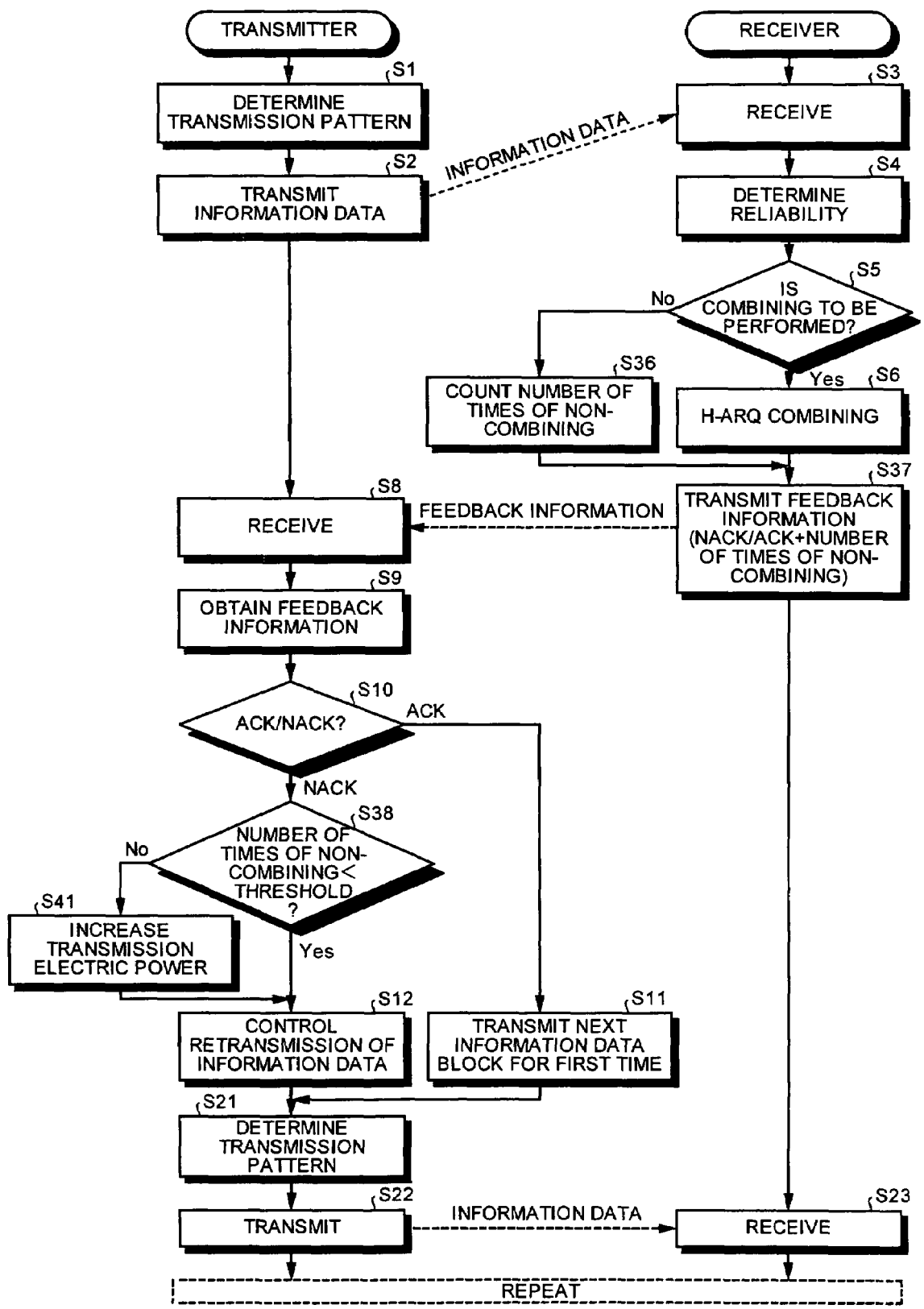
FIG. 12 is a flowchart of a process in a hybrid-ARQ communication system according to a ninth embodiment of the present invention.

Next, a hybrid-ARQ communication system according to a ninth embodiment of the present invention is described. FIG. 12 is a flowchart of a process in the hybrid-ARQ communication system according to the ninth embodiment. In the ninth embodiment, the process at step S39 shown in the eighth embodiment (refer to FIG. 11) is changed. Other processes are identical to those shown in FIG. 11, and therefore are not described herein.

When determining at step S38 whether the number of times when data combining is not performed is less than the predetermined threshold and determining that the number of times is equal to or more than the threshold ("NO" at step S38), the transmitter 1 increases electric power for transmission by a predetermined amount (step S41). The procedure then proceeds to step S12 and continues the process of retransmitting the transmission data. The increased amount of the electric power can be a predetermined fixed value, and can be configured so as to be increased stepwise according to the number of times the procedure passes through step S41.

According to the ninth embodiment described above, the transmitter 1 receives the feedback information, and when the feedback information indicates NACK and the number of times when data combining is not performed reaches the threshold, increases the electric power for transmission, thereby improving a condition of the reception data at the side of the receiver 2.

Figure 13:
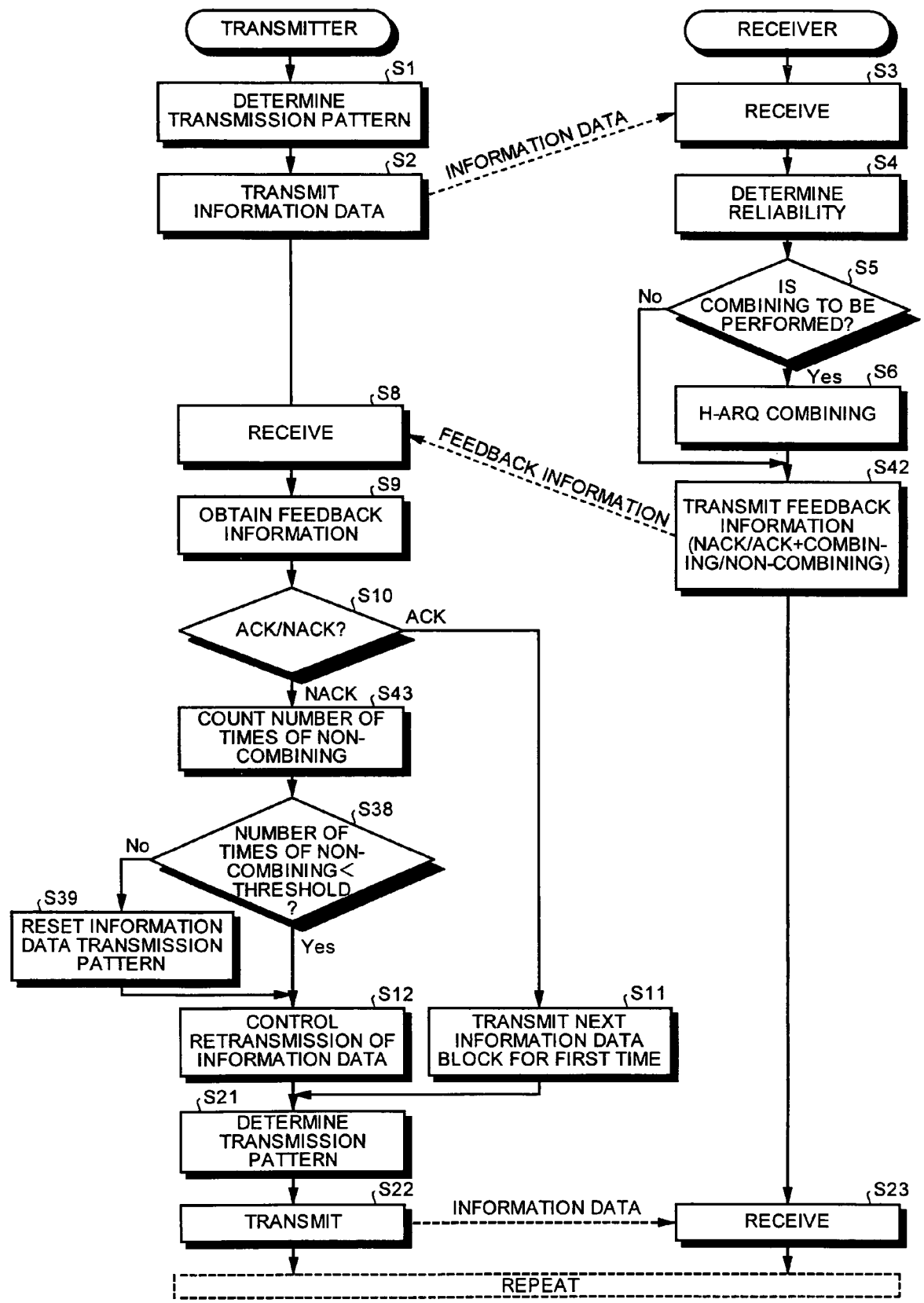
FIG. 13 is a flowchart of a process in a hybrid-ARQ communication system according to a tenth embodiment of the present invention.

Next, a hybrid-ARQ communication system according to a tenth embodiment of the present invention is described. FIG. 13 is a flowchart of a process in the hybrid-ARQ communication system according to the tenth embodiment. In the process according to the tenth embodiment, the receiver 2 transmits, to the transmitter 1, as the additional information of the feedback information (refer to FIG. 10), information that indicates whether H-ARQ combining has been performed, together with information that indicates either NACK or ACK. When the received feedback information indicates NACK, the transmitter 1 obtains the information that indicates either combining or non-combining from the additional information, counts the number of times when data combining is not performed, and when the number reaches a predetermined number, resets the retransmission process so far to transmit the data again from the beginning. In the following, only processes different from those in the eighth embodiment (refer to FIG. 11) are described referring to FIG. 13. The other processes are similar to those shown in FIG. 11, and therefore are not described herein.

At the time of transmitting the feedback information, the receiver 2 transmits, as the additional information to the transmitter 1, information that indicates whether H-ARQ combining has been performed or not (non-combining) on each information data block, together with information that indicates either NACK or ACK, as the feedback information (step S42). As such, at the side of the receiver 2, counting the number of times when data combining is not performed (this process is equivalent to step S36 of FIG. 11) is not performed.

After determining to transmit ACK or NACK based on the feedback information received (step S10), if it is determined to transmit NACK ("NACK" at step S10), the transmitter 1 counts the number of times when data combining is not performed based on the additional information (step S43). Then, a value obtained by counting at step S43 is compared with the threshold to make a determination (step S38). When it is determined that the number of times is equal to or more than the threshold ("NO" at step S38), the transmission pattern of the information data is reset (step S39), and then the procedure proceeds to a retransmission control process (step S12).

According to the tenth embodiment described above, the structure is such that the receiver 2 sends information that indicates either combining or non-combining as the additional information, and the number of times when data combining is not performed is counted at the transmitter 1. Therefore, an entire amount of information (the number of bits) included in the feedback information to be transmitted from the receiver 2 to the transmitter 1 can be suppressed to a minimum, thereby improving throughput of the system.

Figure 14:
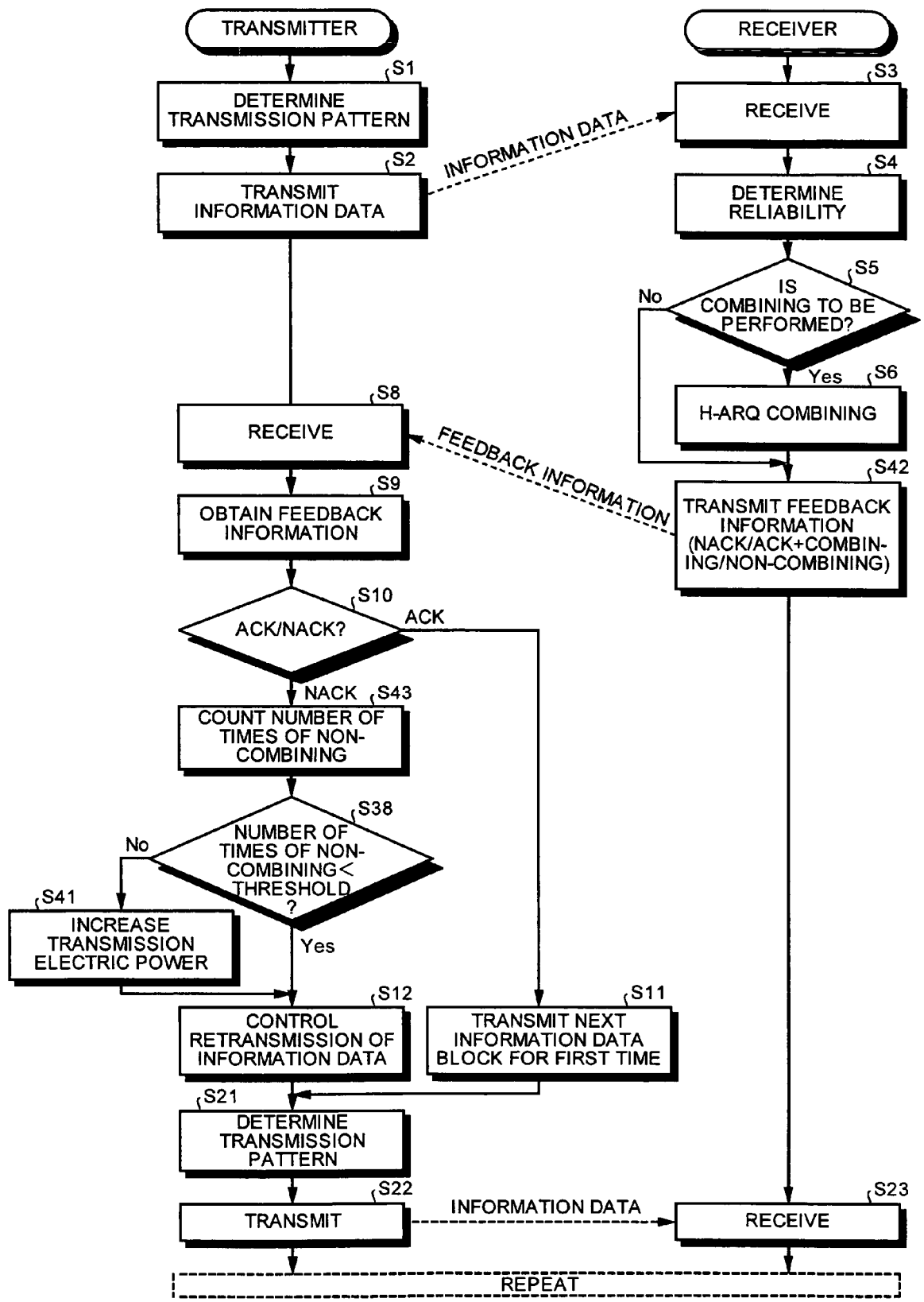
FIG. 14 is a flowchart of a process in a hybrid-ARQ communication system according to a eleventh embodiment of the present invention.

Next, a hybrid-ARQ communication system according to an eleventh embodiment of the present invention is described. FIG. 14 is a flowchart of a process in the hybrid-ARQ communication system according to the eleventh embodiment. In the eleventh embodiment, the structure is such that the receiver 2 described in the tenth embodiment (refer to FIG. 13) performs the process of transmitting the information that indicates either combining or non-combining as the additional information and the transmitter 1 described in the ninth embodiment (refer to FIG. 12) performs the process of increasing transmission electric power.

The structure is explained referring to FIG. 14. When transmitting the feedback information, the receiver 2 transmits, as the additional information (refer to FIG. 10) to the transmitter 1, information that indicates whether H-ARQ combining has been performed or not (non-combining) on each information data block, together with information that indicates either NACK or ACK, when transmitting the feedback information (step S42). Thus, at the side of the receiver 2, the number of times when data combining is not counted (this process is equivalent to step S36 of FIG. 11).

After determining which of ACK and NACK is to be transmitted based on the received feedback information (step S10), if it is determined transmit NACK ("NACK" at step S10), the transmitter 1 counts the number of times when data combining is not performed based on the additional information (step S43). Then, a value obtained by counting at step S43 is compared with the threshold (step S38). When it is determined that the number of times when data combining is not performed is equal to or more than the threshold ("NO" at step S38), electric power for transmission is increased by a predetermined amount (step S41), and then the procedure proceeds to a retransmission control process (step S12).

According to the eleventh embodiment described above, the structure is such that the receiver 2 sends information that indicates either combining or non-combining as the additional information, and the number of times when data combining is not performed is counted at the transmitter 1. Therefore, an amount of the information (the number of bits) included in the feedback information to be transmitted from the receiver 2 to the transmitter 1 can be suppressed to a minimum, thereby improving throughput of the system. Furthermore, the transmitter 1 receives the feedback information and, when the determination is made to transmit NACK and the number of times when data combining is not performed in the additional information reaches the threshold, electric power for transmission is increased. Thus, the state of the reception data received at the side of the receiver 2 can be improved.

Figure 15:
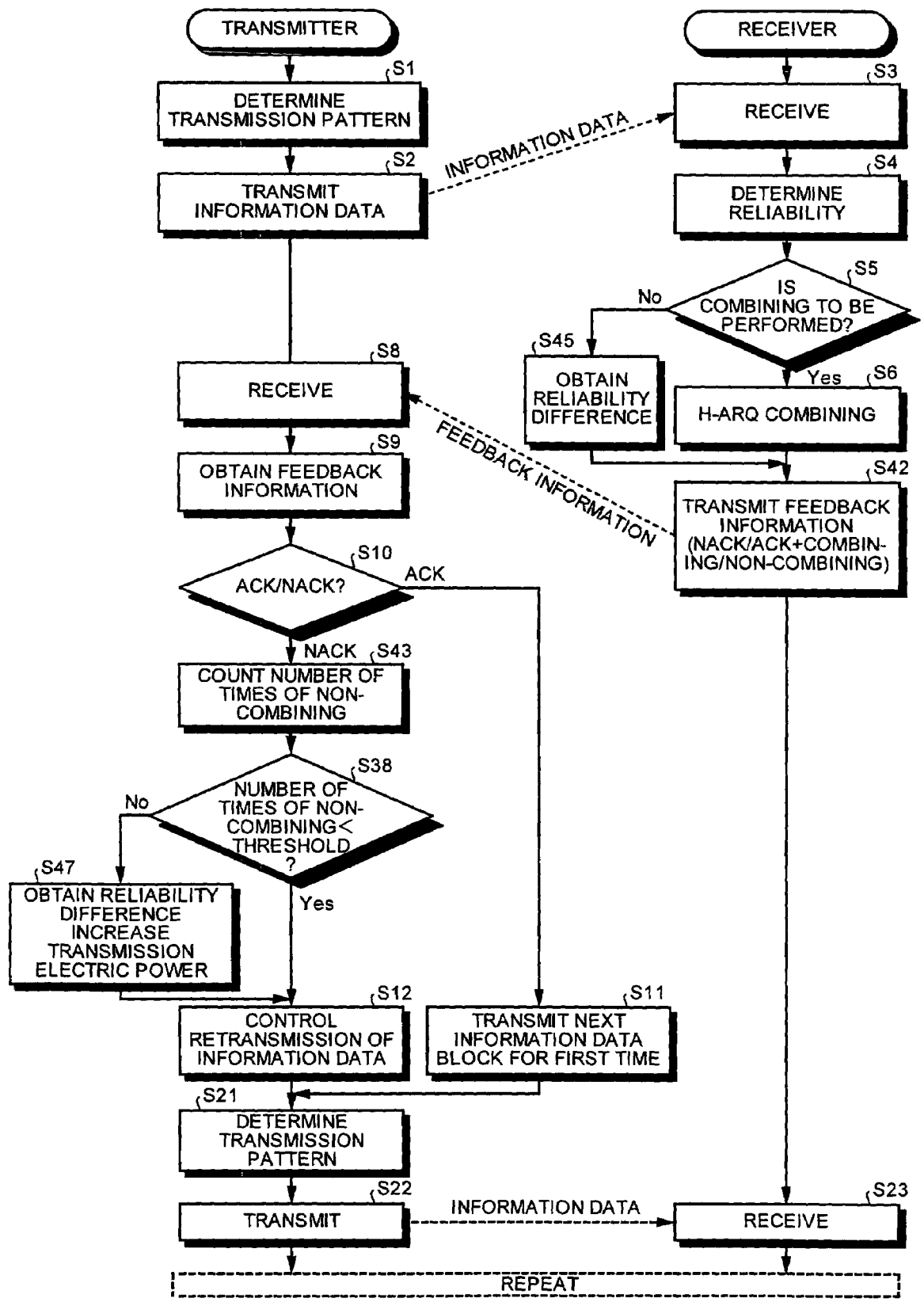
FIG. 15 is a flowchart of a process in a hybrid-ARQ communication system according to a twelfth embodiment of the present invention.

Next, a hybrid-ARQ communication system according to a twelfth embodiment of the present invention is described. FIG. 15 is a flowchart of a process in the hybrid-ARQ communication system according to the twelfth embodiment. In the twelfth embodiment, the information described in the first to seventh embodiments (for example, refer to FIG. 1) that indicates whether H-ARQ combining has been performed on each information data block at the receiver 2, the reception data stored, and the information that indicates a difference in reliability of the retransmission data are taken as the additional information (refer to FIG. 10). Then, such additional information is added to the information that indicates either NACK or ACK in the feedback information, and is then reported to the transmitter 1. In the following, only the processes different from those in the eleventh embodiment (refer to FIG. 14) are described referring to FIG. 15. The other processes are similar to those shown in FIG. 14, and therefore are not described herein.

If determining that the reliability is low and combining is not to be performed ("NO" at step S5), the receiver 2 obtains the difference in reliability (step S45). The difference in reliability is obtained by individually calculating each of reliability of the reception data stored in the H-ARQ buffer 36 (for example, refer to FIG. 2) and reliability of the retransmission data, and by acquiring a difference between the reliabilities. Then, at the time of transmitting the feedback information, information that indicates either NACK or ACK is transmitted as the feedback information. Also, information that indicates whether H-ARQ combining has been performed or not (non-combining) on each information data block and the information that indicates the difference in reliability obtained at step S45 are transmitted to the transmitter 1 as the additional information (step S42).

After determining which of ACK and NACK is to be transmitted based on the feedback information received (step S10), if it is determined to transmit NACK ("NACK" at step S10), the transmitter 1 counts the number of times when data combining is not performed based on the additional information (step S43). Then, a value obtained by counting at step S38 is compared with the threshold (step S38). When it is determined that the number of times is equal to or more than the threshold ("NO" at step S38), the difference in reliability is obtained from the additional information in the feedback information (step S47), and the procedure then proceeds to a process of performing retransmission control (step S12). The transmitter 1 sets and stores a relation between difference in reliability and an amount if electric power to be increased, for example, in a table. Thus, the transmitter 1 reads the amount corresponding to the difference in reliability obtained, to increase electric power for transmission by this amount when retransmitting the transmission data.

According to the twelfth embodiment described above, the information that indicates either combining or non-combining and the difference in reliability are sent from the receiver 2 as the additional information of the feedback information. When the feedback information indicates NACK and the number of times when data combining is not performed reaches the threshold, the transmitter 1 increases the electric power for transmission corresponding to the difference in reliability. In this manner, the transmitter 1 can transmit the transmission data with appropriate amount of electric power for transmission according to variations of conditions of the reception data, thereby efficiently improving a condition of the reception data at the side of the receiver 2.

In the description above, the present invention is not restricted to the embodiments described above, and can be variously modified. For example, for determining the reliability, in addition to the S/N ratio and the SIR, pathmetric likelihood information for estimating probability of correctness of the reception data can be used.

As described above, according to the present invention, reliability of data is determined based on a condition of the data received, and optimum processes of a retransmission request and error correction coding are performed depending on the reliability. Thus, data deterioration can be prevented, and the number of retransmission of data can be reduced. If the reliability is low, unnecessary processes of data combining and error correcting process are not performed, thereby preventing the reliability of existing data from decreasing, and suppressing consumption of power required for an error correcting process. Moreover, the number of retransmission of data can be reduced, thereby improving throughput of a communication system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for receiving data transmitted using an automatic repeat request and an error correcting code, the apparatus comprising:
   a reliability calculating unit that calculates a reliability value that indicates reliability of data in a state of being received;
   an error correcting unit that corrects an error in the data received and that outputs information on a state of an error correction;
   a combining unit that combines, when the data received is resending data re-transmitted from a transmitter, the resending data with existing data;
   a determining unit that performs, when the reliability value is higher than a predetermined value, instructing the combining unit to combine the resending data with the existing data and determining whether to make a resending request based on the state of the error correction, and when the reliability value is lower than the predetermined value, performs outputting the resending request to the transmitter without instructing the combining-unit to combine the resending data with the existing data; and
   a responding unit that responds to the transmitter by transmitting information on a result of the determination by the determining unit.

2. The apparatus according to claim 1, wherein
the reliability calculating unit calculates the reliability value based on a measurement value that indicates a reception performance of the data received, and
when a ratio of the measurement value of the resending data to the measurement value of the existing data is smaller than a predetermined ratio, the determining unit performs outputting the resending request to the transmitter without instructing the combining unit to combine the resending data with the existing data and the error correcting unit to perform an error correction process.

3. The apparatus according to claim 2, wherein
the measurement value is a value obtained by averaging an absolute value of the data received.

4. The apparatus according to claim 2, wherein
the measurement value is a signal-to-noise ratio of the data received.

5. The apparatus according to claim 1, wherein
the reliability calculating unit calculates the reliability value based on a measurement value that indicates a reception performance of the data received, and
when the measurement value of the resending data is smaller than a predetermined value, the determining unit performs outputting the resending request to the transmitter without instructing the combining unit to combine the resending data with the existing data and the error correcting unit to perform an error correction process.

6. The apparatus according to claim 5, wherein
the measurement value is a value obtained by averaging an absolute value of the data received.

7. The apparatus according to claim 5, wherein
the measurement value is a signal-to-noise ratio of the data received.

8. The apparatus according to claim 1, wherein
the reliability calculating unit calculates the reliability value based on a bit range of a quantization bit of the data received, and
when a quantization range of the resending data is such a quantization range that pulls a quantization range of the existing data to a lower level if the existing data is combined with the resending data, the determining unit determines that the reliability of the resending data is low.

9. The apparatus according to claim 8, wherein
the reliability calculating unit calculates a position of a quantization bit of data to be obtained as a result of combining the existing data and the resending data, based on an average value and number of the existing data, an average value and number of the resending data, and an assumed average value and assumed number of the data to be obtained, and
when the position of a quantization bit of the data to be obtained and a position of a quantization bit of the existing data do not overlap each other, the determining unit determines that the reliability of the resending data is low.

10. The apparatus according to claim 8, wherein
when a difference between a position of the quantization bit of the existing data and a position of the quantization bit of the resending data is equal to or more than a predetermined value, and when a range of the quantization bit of the existing data and the range of the quantization bit of the resending data do not overlap each other, the determining unit determines that the reliability of the resending data is low.

11. The apparatus according to claim 10, wherein
even when determining that the reliability is low, the determining unit instructs the error correcting unit to perform an error correction process on the resending data, and
when an error is found in the resending data in the error correction process, the determining unit outputs the resending request to the transmitter.

12. A communication system in which data is transmitted and received between a transmitter and a receiver using an automatic repeat request and an error correcting code, wherein
the receiver includes
   a reliability calculating unit that calculates a reliability value that indicates reliability of data in a state of being received;
   an error correcting unit that corrects an error in the data received and that outputs information on a state of an error correction;
   a combining unit that combines, when the data received is resending data re-transmitted from a transmitter, the resending data with existing data;
   a determining unit that performs, when the reliability value is higher than a predetermined value, instructing the combining unit to combine the resending data with the existing data and determining whether to make a resending request based on the state of the error correction, and when the reliability value is lower than the predetermined value, performs outputting the resending request to the transmitter without instructing the combining unit to combine the resending data with the existing data; and a responding unit that responds to the transmitter by transmitting feedback information including information on a result of the determination by the determining unit and additional information on data combining performed by the data combining unit, and the transmitter includes an information receiving unit that receives the feedback information; and a transmission-pattern specifying unit that specifies a transmission pattern by reconfiguring contents of the resending data based on the additional information when the feedback information indicates the result to make the resending request.

13. The communication system according to claim 12, wherein the responding unit adds, to the additional information, information on non-combining number that indicates number of cases in which the resending data has failed to be combined with the existing data, and when the non-combining number reaches a predetermined number, the transmission-pattern specifying unit resets a transmission pattern of the resending data to retry transmission of the resending data.

14. The communication system according to claim 12, wherein the responding unit adds, to the additional information, information of non-combining number that indicates number of cases in which the second data has failed to be combined with the existing data, and when the non-combining number reaches a predetermined number, the transmission-pattern specifying unit controls to increase electric power for transmitting the resending data by a predetermined amount.

15. The communication system according to claim 12, wherein the responding unit adds, to the additional information, combining information on whether the resending data has been combined with the existing data, and when it is determined, based on the combining information, that number of cases in which the resending data has failed to be combined reaches a predetermined number, the transmission-pattern specifying unit resets a transmission pattern of the resending data to retry transmission of the resending data.

16. The communication system according to claim 12, wherein the responding unit adds, to the additional information, combining information on whether the resending data has been combined with the existing data, and when it is determined, base on the combining information, that number of cases in which the resending data has failed to be combined reaches a predetermined number, the transmission-pattern specifying unit controls to increase electric power for transmitting the resending data by a predetermined amount.

17. The communication system according to claim 12, wherein the reliability calculating unit calculates difference in reliability between the existing data and the resending data, the responding unit adds, to the additional information, combining information on whether the resending data has been combined with the existing data and information on the difference in reliability, and when it is determined, base on the combining information, that number of cases in which the resending data has failed to be combined reaches a predetermined number, the transmission-pattern specifying unit controls to increase electric power for transmitting the resending data by an amount corresponding to the difference in reliability.

* * * * *